United States Patent [19]

Winner et al.

[11] Patent Number: 5,706,479
[45] Date of Patent: Jan. 6, 1998

[54] METHOD AND APPARATUS FOR DYNAMICALLY DETECTING OVERFLOW OF A MULTI-LAYER BUFFER

[75] Inventors: Stephanie Winner, Santa Clara; Michael Kelley, San Mateo, both of Calif.

[73] Assignee: Apple Computer, Inc., Cupertino, Calif.

[21] Appl. No.: 537,384

[22] Filed: Oct. 2, 1995

[51] Int. Cl.$^6$ .................................................. G06T 1/60
[52] U.S. Cl. ........................... 395/509; 395/122; 395/511
[58] Field of Search .................................. 395/122, 507, 395/511, 509, 501, 119, 135; 345/185, 189

[56] References Cited

U.S. PATENT DOCUMENTS

| | | | |
|---|---|---|---|
| 4,924,414 | 5/1990 | Ueda | 395/122 |
| 5,218,670 | 6/1993 | Sodek, Jr. et al. | 395/511 |
| 5,345,541 | 9/1994 | Kelley et al. | 395/126 |
| 5,583,974 | 12/1996 | Winner et al. | 395/122 |

OTHER PUBLICATIONS

Patmesil & Hoffert, Computer Graphics "The Pixel Machine: A Parallel Image Computer", 1989, pp. 69–78.
Foley, Computer Graphics "Principles and Practice" Second Edition, pp. 92–99.
Mammen, IEEE "Transparency and Antialiasing Algorithms Implemented with the Virtual Pixel Maps Technique", 1989, pp. 43–55.

*Primary Examiner*—Kee M. Tung
*Attorney, Agent, or Firm*—Blakely, Sokoloff, Taylor & Zafman

[57] ABSTRACT

In a computer graphic system a method and apparatus for dynamically maintaining an overflow flag in a multi-layer buffer. A circuit for maintaining an overflow signal is provided. This circuit is provided new pixel data from the computer system and old pixel data from a memory and in response dynamically asserts or de-asserts the overflow signal. An increment and decrement generator, which is coupled to the new overflow generator, is provided a new overflow signal and an old overflow signal and in response generates an increment signal and a decrement signal. An overflow tracking circuit, which is coupled to the increment and decrement generator, is provided. The overflow tracking circuit uses the increment and decrement signals to maintain an overflow count value.

21 Claims, 11 Drawing Sheets

METHOD AND APPARATUS FOR DYNAMICALLY DETECTING OVERFLOW OF A MULTI-LAYER BUFFER

BACKGROUND OF THE INVENTION

1. Field of the Invention

The present invention relates to the field of computer graphics, and particularly to a method and apparatus for dynamically detecting overflow of a multi-layer buffer.

2. Description of the Related Art

Typically, computer graphic systems interactively represent a three-dimensional scene as a collection of three-dimensional graphical primitives (i.e., three-dimensional objects), which are defined in a three-dimensional world coordinate system. These systems then transform, project, and clip these three-dimensional graphical primitives from their three-dimensional object database, in order to generate a collection of two-dimensional geometric entities, which are defined with respect to a display device coordinate system (such as a two-dimensional screen space coordinate system).

Common two-dimensional geometric entities are character strings, points, straight lines, curved lines, and filled areas (such as polygons, circles, etc.). For instance, graphical primitives are commonly represented by polygon meshes, which are sets of connected, polygonally bounded planar surfaces (such as triangles or quadrilaterals). In addition, for each geometric entity, the computer system stores corresponding attributes that describe how the particular entity is to be displayed. Common attributes that are stored by the computer system include color specifications, line styles, and text styles.

Moreover, often a processor represents a two-dimensional geometric entity by boundary and attribute defining data (e.g., by a data structure which contains the coordinate and attribute information for the vertices of the geometric entity). The processor then supplies the boundary and attribute defining data of a geometric entity to a rendering pipeline, which generates the pixel data for all of the pixels of a display device that are covered by the geometric entity. The rendering pipeline then stores the generated pixel data in a frame buffer, where it resides until it is rasterized to produce the two-dimensional geometric entity on a display device (i.e., the two-dimensional geometric entity is formed by using the stored pixel data in the frame buffer to manipulate pixels of the display device). This process of transforming a collection of three-dimensional graphical objects into two-dimensional displayed images is called rendering. Literally, the rendering process takes three-dimensional object information and converts it to two-dimensional pixel representation of the object.

One attribute that computer graphic systems often store is the depth (Z) value for each point of the geometric entities. The Z-values represent the distance between the viewer and the particular point of the geometric entity. For example, small Z-values indicate that the geometric entity is close to the observer, whereas large Z-values indicate that the geometric entity is further away. Thus, Z-value data allows the computer graphics system to determine if a first geometric entity appears in front of or behind of a second geometric entity.

There are four approaches in the prior art for storing Z-values. The most common approach assumes that all of the geometric entities are opaque, and therefore uses (1) a single layer Z-buffer which stores one depth value for each pixel of the display device, and (2) a frame buffer which stores pixel color values. Under this approach, the Z-buffer is initialized to the background, which represents the Z-value at the back clipping plane, and the frame buffer is initialized to the background color. The largest value that can be stored in the Z-buffer represents the Z of the front clipping plane. Also, under this approach, geometric entities are scan-converted into the frame buffer in an arbitrary order. Consequently, during the scan conversion process, if the geometric entity point being scanned converted at (x,y) is no farther (i.e., being at a distance which is less than or equal to the distances of the other points) from the viewer than is the point whose color and depth are currently in the buffers, then the new points' color and depth replaces the old values.

In other words, in these conventional Z-buffers, a Z-sort operation is performed by comparing the Z-value of the incoming data with the Z-value of the pre-existing data stored in the frame buffer. If the incoming geometric entity data is closer, the incoming color data replaces the pre-existing data in the frame buffer, and the old Z-value in Z-buffer is replaced by the new Z-value. Otherwise, the incoming data is discarded. When there is no more incoming data, the Z-sort is complete, and the contents of each frame buffer location represents the final color for that particular pixel.

The second prior art approach does not assume that the rendered geometric entities are all opaque and therefore retains information about background entities that fall behind a non-opaque front entity. More specifically, to avoid the loss of data, some prior art Z-value storing systems require that all of the non-opaque data be rendered after all opaque data has been rendered and that the non-opaque data be rendered in Z-sorted ordered (e.g., furthest to closest).

Any non-opaque geometric entity which is behind opaque geometric entities in the frame buffer is discarded. The remaining non-opaque geometric entities are composited with the data in the frame buffer and the composite result is stored in the frame buffer so that no requisite information is lost. The composite result represents a combination of the data from non-opaque geometric entities. For example, if a non-opaque blue entity's pixel data is composited with a non-opaque red entity's pixel data, the resulting composite entity pixel data may appear mostly blue, mostly red, or purple. Since the compositing operation must be performed in a specific Z order, the non-opaque entities must be arranged by Z-Depth (i.e., either closest to furthest or furthest to closest) before being compared with the Z-value of the data in the buffer.

Unfortunately, this method of rendering non-opaque entities has a number of shortcomings. Sorting the non-opaque entities by Z-value is computationally expensive. Also, this method does not render interpenetrating non-opaque entities correctly; these must be explicitly tested for, and specially processed, which further increases computation. Consequently, performing the Z-sort process reduces the amount of time left to actually draw the images which detrimentally impacts the overall display process.

Like the second prior art approach, the third prior art approach does not assume that the rendered geometric entities are all opaque and therefore retains information about background entities that fall behind non-opaque front entities. However, unlike the second prior art approach, the third prior art approach uses a multi-layer buffer that accepts non-sorted non-opaque data.

These prior art multi-layer buffers have a pixel storage location for each pixel of the display device. In addition, at each pixel storage location, these buffers store up to N Z-values and N color values for their corresponding pixels (prior to compositing non-opaque data and performing the scan conversion) in order to allow some number of the closest non-opaque entities to be saved and then composited later. Moreover, some of these multi-layer buffers utilize only one buffer circuitry to store both the Z and the color values for each pixel, whereas others utilize one buffer circuitry to store the Z values and another to store the color values per pixel.

Examples of computer graphics systems that utilize multi-layer buffers are disclosed in the U.S. patent application for a "Computer Graphics System Having High Performance Multiple Layer Z-buffer," Ser. No. 08/237,639, filed May 4, 1994 now U.S. Pat. No. 5,583,974 and assigned to Apple Computer, Inc.; "Computer Graphics System Having High Performance Multiple Layer Z-buffer," Ser. No. 08/060,299, filed May 10, 1993 now abandoned and assigned to Apple Computer, Inc. As referenced in the above-noted applications, these N-layer buffers are sometimes referred to as multi-layer Z-buffers.

The third prior art approach is advantageous over the second prior art approach in that it defers the compositing operation until after all of the geometric entities' data are submitted to the Z-buffer for sorting, which in turn improves performance by avoiding unnecessary compositing of entities' pixel data which are later obscured by closer objects. However, the manner by which this prior art approach manages overflows is problematic. An overflow occurs when a particular pixel storage location in the multi-layer buffer cannot store all of the pixel data that it receives.

Several prior art schemes have been developed for managing an overflowed multi-layer buffer. Under one approach, after an overflow condition is detected, the N-stored pixel data at the pixel storage locations that have overflowed are composited. The composited results are then stored in the first layer of the overflowed pixel storage locations of the multi-layer buffer. Some prior art multi-layer buffer schemes refer to the composited results as infinite curtains. These prior art schemes refer to the composite results as infinite curtains, because the composite operation theoretically enables pixel data from infinite number of geometric entities to be stored at a particular pixel storage location. This is because a prior-composite result can always later be composited again with the pixel data of other non-opaque entities that are stored in the particular pixel storage location after the earlier composite operations.

For example, if a second overflow is detected at a particular pixel storage location after a first overflow has caused a first composite result to be generated and stored, a second composite operation is performed in which the first composite result and the pixel data of the later stored entities are composited. Thus, this compositing scheme can be used to store an infinite number of non-opaque objects in the multi-layer buffer. After this compositing operation, all the objects are re-submitted to the multi-layer buffer for storing.

This method of managing an overflow (by compositing an infinite curtain and then re-submitting the geometric entities to the buffer) is time consuming and therefore reduces the overall system performance. Consequently, there is a need for an overflow management method and apparatus, which improves the overall system performance by reducing the number of infinite curtain compositions and resubmissions.

Figure 1:
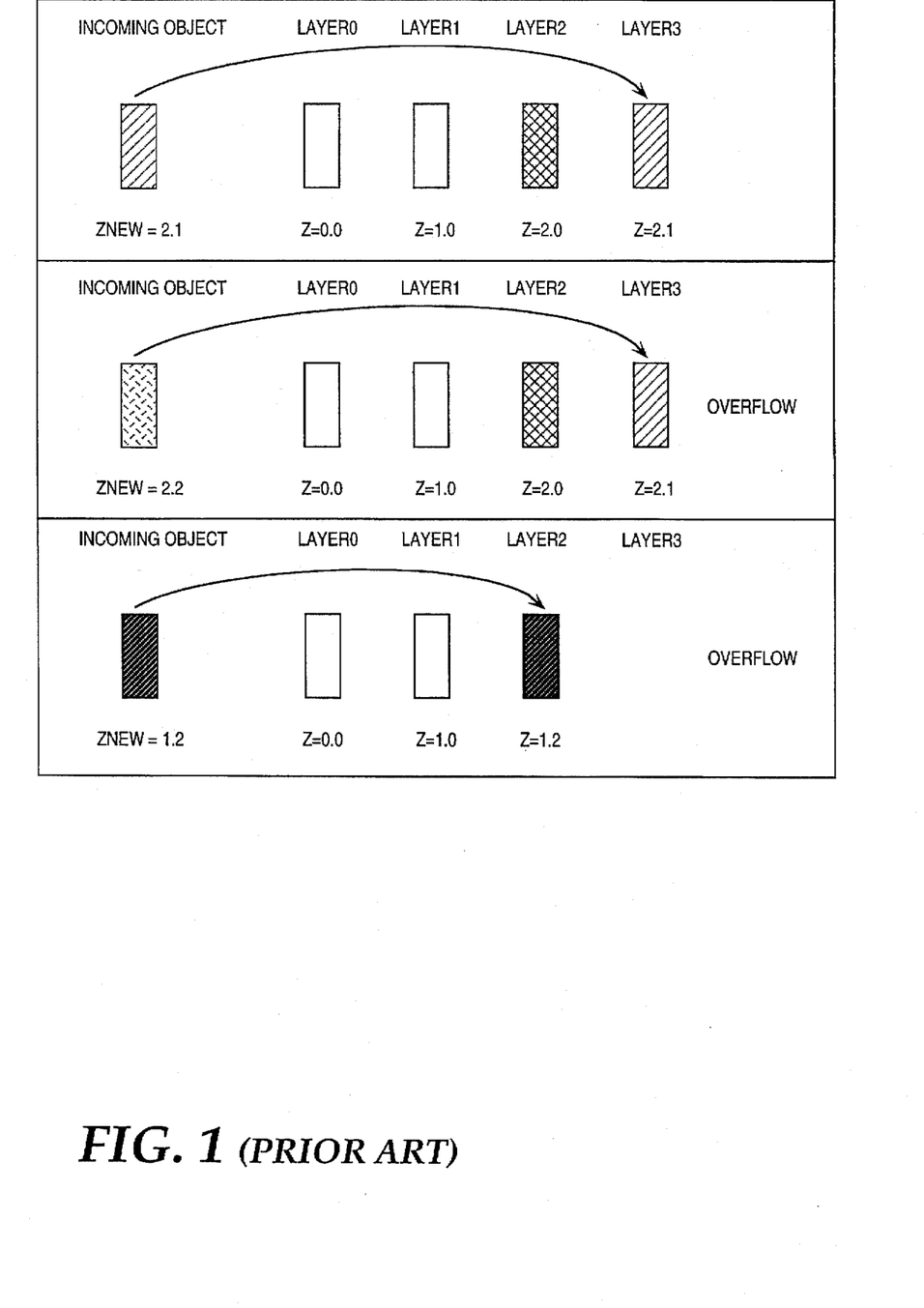
FIG. 1 illustrates an example of a prior art overflow detection scheme for a four layer buffer.

More specifically, under the prior art approach, once an overflow signal is asserted for the buffer, it is not negated until (1) infinite curtains have been generated for the overflowed pixel storage locations, and (2) all the geometric entities are resubmitted to the multi-layer buffer. After the infinite curtain is generated the overflow signal is then negated. FIG. 1 shows an example of a prior art overflow detection scheme for a four layer buffer. The first row of this figure, depicts a pixel storage location that stores pixel data for three non-opaque geometric entities, at Z=0.0, 1.0, and 2.0. This pixel storage location receives pixel data for a geometric entity with Z=2.1, and places this pixel data in its fourth layer. At this point all of the layers of the pixel storage location are populated. The second row of FIG. 1 shows the pixel storage location receiving pixel data for a new non-opaque geometric entity with Z=2.2. This pixel data causes the pixel storage location to overflow, and thereby causes an overflow signal to be asserted.

As mentioned before, in response to this asserted overflow signal, a prior art multi-layer buffer composites infinite curtains and resubmits the geometric entities to the buffer irrespective of whether the pixel storage location overflow is later rendered non-consequential. More specifically, sometimes the composition of the infinite curtain and the resubmission of the geometric entities are completely unnecessary. For example, as shown in the third row of FIG. 1, if after an overflow signal has been asserted, an opaque object is received and is stored in one of the layers of the overflowed pixel storage location, the overflow is rendered non-consequential because the pixel data from the opaque geometric entity obscures the pixel data from the geometric entities that fall behind it. In other words, the third row of FIG. 1 shows the overflowed pixel storage location receiving pixel data for a sixth geometric entity with Z=1.2. Consequently, as this sixth entity is opaque and as it is placed in the third layer of the buffer, this opaque object obscures the pixel data for the background entities with Z=2.0, 2.1, and 2.2, and thereby effectively eliminates the need for maintaining the pixel data for these background geometric entities.

Figure 2:
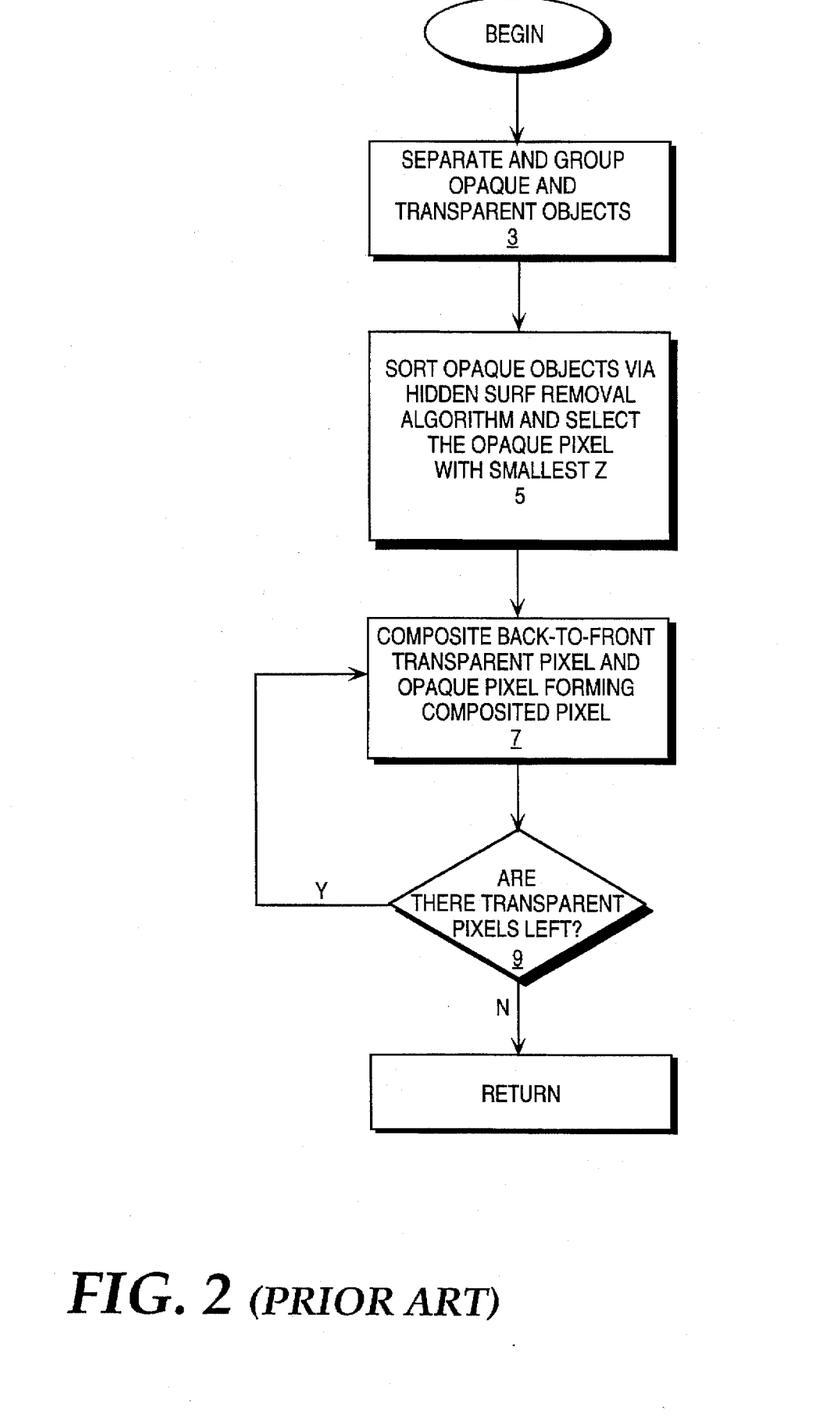
FIG. 2 illustrates the flow steps of a prior art approach to handling overflows.

The fourth prior art approach that combines several of the previously discussed approaches has the steps as illustrated in FIG. 2. This prior art approach first separates and groups the opaque and transparent objects (block 3). Next, it sorts the opaque objects first via a hidden surface removal algorithm, which is well known in the art, and selects the opaque pixel with the smallest Z-value (block 5). The prior art method then composites back-to-front the transparent pixel and the opaque pixel forming a composited pixel (block 7). It continues compositing back-to-front until there are no transparent pixels left (blocks 7 and 9). For an example of this prior art method please see the article entitled "Transparency and Antiliasing Algorithm Implemented with a Virtual Pixel Maps Technique" by Abraham Mammen in the Institute of Electronic and Electrical Engineers (IEEE) July 1989 issue of *Computer Graphics and Applications*.

There are numerous disadvantages to this approach. First, since this technique implements a back-to-front compositing, this method cannot incorporate a Constructive Solid Geometry (CSG) algorithm, which is known in the art. Furthermore, this method cannot incorporate shadow volume rendering algorithms. Last, this technique is inflexible in that it requires a sorting and separating of the opaque pixels from the transparent pixels at the very beginning of the process which is difficult. Moreover, this method precludes the dynamic evaluation of an overflow status that is inherent in the present invention.

Unfortunately, in these prior art designs it is not possible to negate the overflow signal once it has been asserted.

Consequently, infinite curtain composition operations have to be performed. In addition, after the infinite curtain composite operations are performed, the overflow signal is reinitialized (negated) and all of the geometric entities are resubmitted for storing in the buffer. Therefore, there is a need for an overflow management method and apparatus, which improves the overall system performance by eliminating unnecessary composition and resubmission operations.

SUMMARY OF THE INVENTION

For a computer graphics system that has a display device and a multi-layer buffer, the present invention provides a method and apparatus for dynamically detecting overflow of the buffer. The multi-layer buffer has one pixel data storage location for each pixel of the display device, where the pixel data storage location stores more than one object's pixel data for its pixel. One embodiment of the present invention's method starts by initializing an overflow count value to zero, where the overflow count value indicates the number of overflowed storage locations for the pixels of the region of the display device that the buffer stores object pixel data for. This method then (1) receives a submitted object's pixel data, (2) attempts to store this object's pixel data in the multi-layered buffer at a pixel data storage for the pixel identified by the object's pixel data, and (3) increments the count value in the first direction, if the pixel storage location was not overflowed prior to the attempt to store the object's pixel data but is overflowed after the attempt, and (4) decrements the count value in a second direction if the pixel storage location was overflowed prior to the attempt but is not overflowed after the attempt.

BRIEF DESCRIPTION OF THE DRAWINGS

The objects, features, and advantages of the present invention will be apparent from the following description, in which.

DETAILED DESCRIPTION OF THE INVENTION

The present invention provides a method and apparatus for dynamically detecting overflow of a multi-layer buffer.

In the following description, numerous details are set forth in order to provide a thorough understanding of the present invention. However, it will be understood by one of ordinary skill in the art that these specific details are not required in order to practice the invention. In other instances, well-known electrical structures and circuits are shown in block diagram form in order not to obscure the present invention with unnecessary detail.

Figure 3:
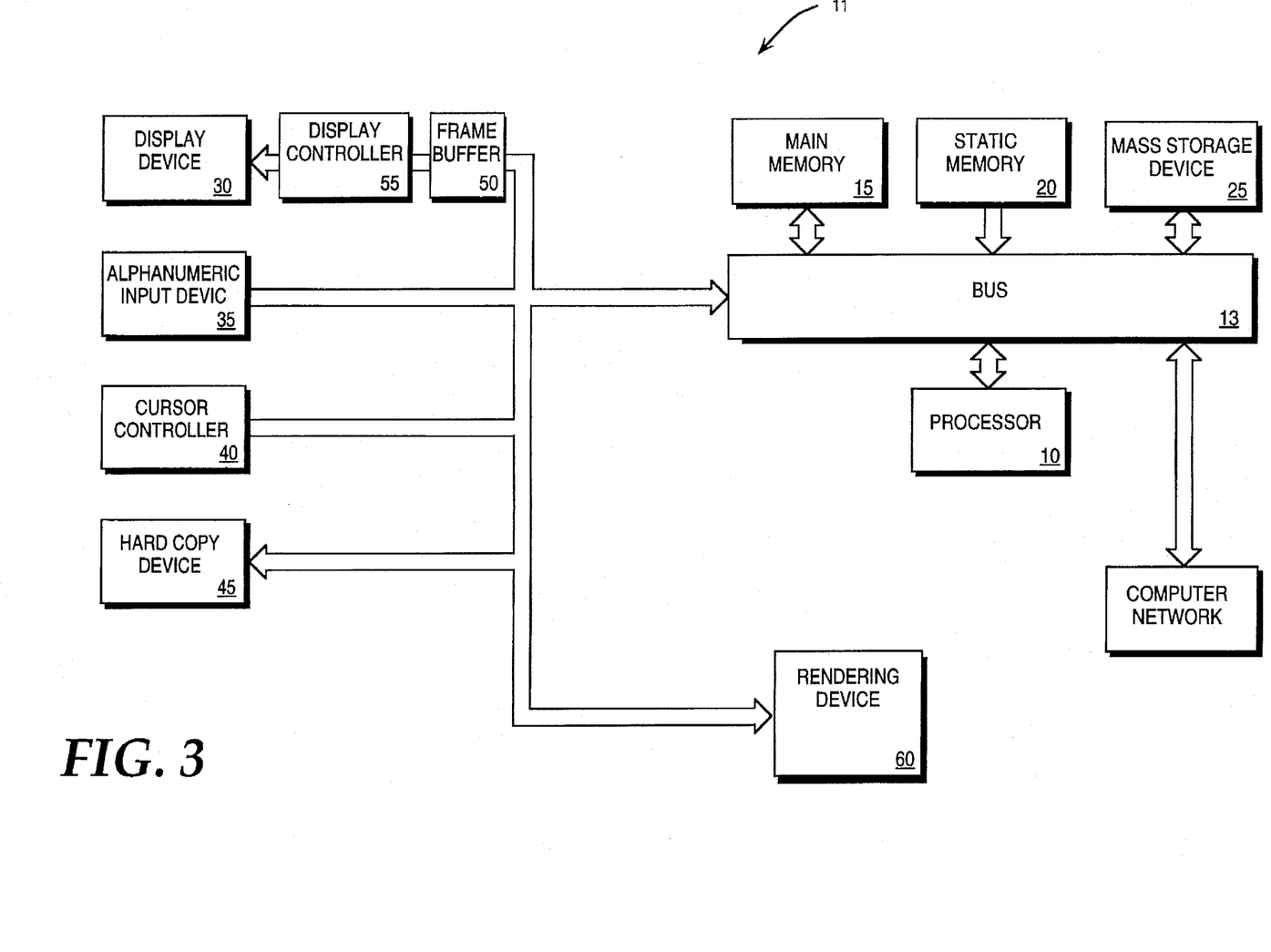
FIG. 3 illustrates a computer system in which the present invention may be implemented.

For purpose of explanation, FIG. 3 presents a computer system upon which one embodiment of the present invention is implemented. However, one of ordinary skill in the art will appreciate that any other type of configuration for a computer system may be used in conjunction with the present invention. Computer system 11 includes a bus or other communication means 13 for communicating information. A processor 10 couples with bus 13 for processing digital data. Computer system 11 further includes a random access memory (RAM) or some other dynamic storage device 15 (referred to in FIG. 3 as main memory), which also couples to bus 13. Main memory 15 stores digital data and program instructions for execution by processor 10. Main memory 15 also may be used for storing temporary variables or other intermediate information during execution by processor 10. Computer system 11 also includes static storage device 20 (such as a read only memory (ROM)) coupled to bus 13 for storing static information and instructions for processor 10. In addition, mass data storage device 25, such as magnetic disk or an optical disk and its corresponding disk drive, may also be included.

Alphanumeric input device 35 (e.g., a keyboard) may also be coupled to bus 13 for communicating information and command selections to processor 10. An additional user input device which may be included in computer system 11 is cursor controller 40. Input device 40 may take many different forms such as a mouse, a trackball, a stylus tablet, a touchpad, etc. Computer system 11 may also have external hard copy device 45, which may be used for printing a hard copy on paper.

Computer system 11 further includes a display device 30, such as a cathode ray tube (CRT) or a liquid crystal display (LCD), for displaying information to a computer user. Display device 30 couples to bus 13 via flame buffer 50 and display controller 55. Display controller 55 serves as an interface between computer system 11 and display device 30. Furthermore, frame buffer 50 stores the pixel data for driving the display device 30. This stored pixel data is generated by rendering device 60, also known as a graphics accelerator. As further discussed below, at the end of the rendering process, rendering device 60 outputs a high bandwidth pixel stream to frame buffer 50. The information that rendering device supplies to the frame buffer typically consists of pixel data of images or scan lines that are rendered.

For purpose of explanation, a brief general description of one embodiment of rendering device 60 is provided below by reference to FIG. 4. As shown in this figure, one embodiment of rendering 60 utilizes a screen partitioning rendering scheme which allows performance to be improved (1) by enabling simultaneous rendering of several different partitioned regions of the screen, and/or (2) by allowing a smaller (and therefore faster and cheaper) memory than a system frame buffer to be used for storing each region's pixels while rendering occurs. More specifically, under this approach, the rendering process begins when the processor or a dedicated graphics accelerator 65 transforms, projects, and clips three-dimensional graphical primitives (defined in a three-dimensional world coordinate system) from its three-dimensional object database, in order to obtain a collection of two-dimensional geometric entities (defined in a display device coordinate system, such as a two-dimensional screen space coordinate system) that represent the primitives on the display device.

Moreover, in one embodiment of the invention, the processor represents a two-dimensional geometric entity by boundary and attribute defining data (e.g., by a data structure which contains a coordinate and attribute information for the vertices of the geometric entity). Furthermore, in one embodiment of the invention, the two-dimensional geometric entity is a triangle which is represented by three coordinate points, where each of the coordinate points have one or more parameter values which must be interpolated across the triangle. The segments which interconnect the three coordinate points define the bounds of a triangle. In another embodiment of the present invention, the two-dimensional polygon is a quadrilateral, which is defined similarly to a triangle except that it will be defined by four coordinate points (and four corresponding sets of parameter values). In one embodiment of the present invention, a quadrilateral may be provided to the rendering device but it would be converted into a pair of triangles for rendering (each utilizing three of the four coordinate points).

The processor then supplies the boundary and attribute defining data of a geometric entity to a rendering pipeline, which generates the pixel data for all of the pixels that are covered by the geometric entity in a particular region. More specifically, as further shown in FIG. 4, after processor 65 transforms, projects, calculates parameter values, and clips three-dimensional graphical primitives to obtain two-dimensional geometric entities, the processor uses known partitioning schemes (such as those disclosed in "The Pixel Machine: A Parallel Image Computer," ACM Computer Graphics, Vol. 23, No 3, p 69–78) to determine which partitioned region of the display device the geometric entities intersect. For example, as shown in FIG. 5, if the computer graphics systems partitions a display screen into four regions and processor 65 transforms, projects, and clips a three-dimensional graphical primitive to obtain geometric entity 66, the partitioning mechanism of the processor determines that geometric entity 66 covers a first set of pixels 68 in the third region and a second set of pixels 72 in the fourth region. After the processor determines which partitioned regions of the display device the geometric entities intersect, the processor inserts into each region's geometric entity list data pertaining to the geometric entity that intersects the particular region.

Triangles which cross more than one partition are added to all affected partition's geometry lists. These geometric entity lists are then stored in one or more rendering pipeline list databases. The geometric entities stored in each rendering pipeline list database are then rendered by one rendering pipeline. Once all the geometric entities for all of the three-dimensional graphical primitives have been processed and placed in their respective partition lists, the rendering pipelines begin processing those lists to render the partitions. For example, as shown in FIG. 4, more than one rendering pipeline $69_1$–$69_N$ is used in the rendering process when more than one rendering pipeline list database $67_1$–$67_N$ are used to store the region geometric entity lists. Although it is possible for only a single rendering pipeline to be used to render the partitions one-by-one, two or more pipelines are used to increase performance.

Figure 4:
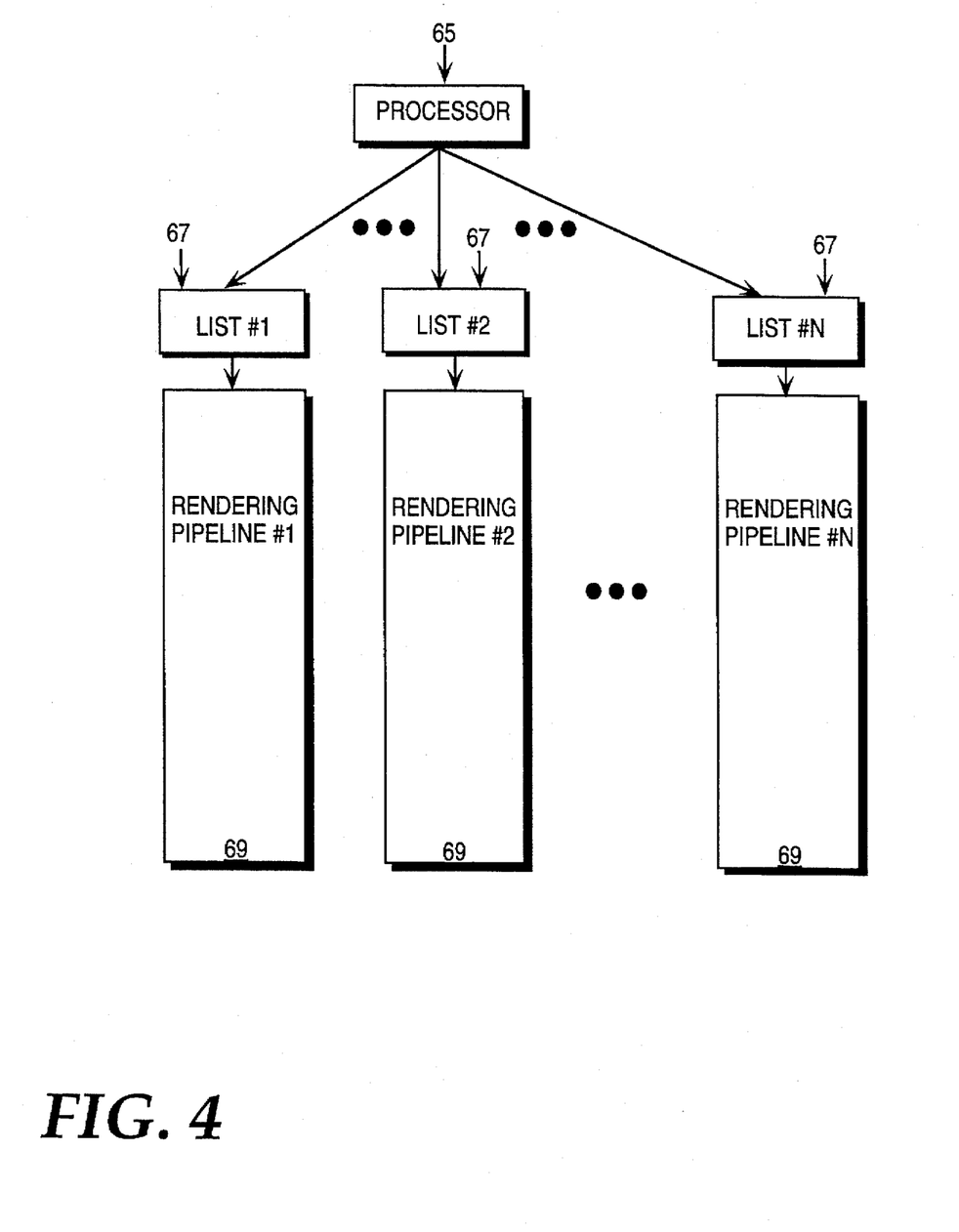
FIG. 4 presents one embodiment of the rendering architecture of the present invention.
Figure 5:
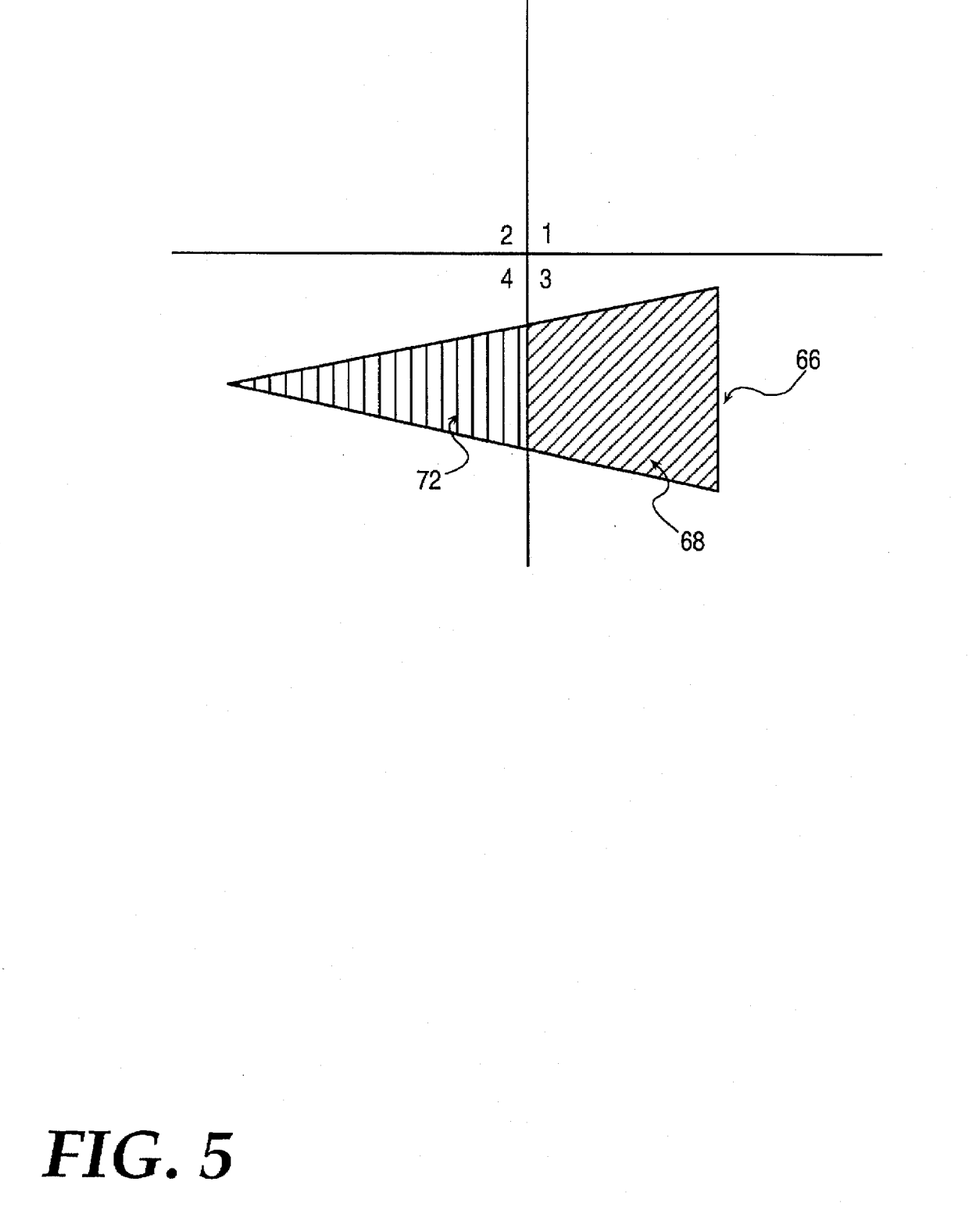
FIG. 5 illustrates a geometric entity that is displayed on a display device that is partitioned into four regions.

In this manner, the embodiment of rendering device 60 that is set forth in FIG. 4 partitions the two-dimensional screen space into a number of regions and then renders the regions by using more than one rendering pipeline. For purpose of explanation, a description of one embodiment of a rendering pipeline 69 is provided below by reference to FIG. 6. More detailed explanations of the operation of some of the modules of rendering pipeline 65, and of some of the additional features that can be incorporated in this rendering pipeline (such as parameter interpolation shadow plane tests, and alpha blending), can be found in the U.S. patent applications entitled: "Computer Graphics System Having High Performance Multiple Layer Z-Buffer," Ser. No. 08/237,639, filed May 4, 1994 now U.S. Pat. No. 5,583,974 and assigned to Apple Computer, Inc.; "Computer Graphics System Having High Performance Multiple Layer Z-Buffer," Ser. No. 08/060,299, filed May 10, 1993 now abandoned and assigned to Apple Computer, Inc.; "Method And Apparatus For Distributed Interpolation Of Pixel Shading Parameter Values," Ser. No. 07/812,563, filed Dec. 20, 1991 and assigned to Apple Computer, Inc.; "Method And Apparatus For Simultaneously Rendering Multiple Scanlines," Ser. No. 07/811,570, filed Dec. 20, 1991 now U.S. Pat. No. 5,307,449 and assigned to Apple Computer, Inc.; "A Scanline Rendering Device For Generating Pixel Values For Displaying Three-Dimensional Graphical Images," Ser. No. 08/359,953, filed Dec. 19, 1994 now U.S. Pat. No. 5,517,603 and assigned to Apple Computer, Inc.; "Method And Apparatus For Approximating A Signed Value Between Two Endpoint Values In A Three-Dimensional Image Rendering Device," Ser. No. 08/051,473 filed Apr. 22, 1993 now U.S. Pat. No. 5,402,533 and assigned to Apple Computer, Inc.; and, in U.S. Pat. No. 5,345,541, entitled "Method And Apparatus For Approximating A Value Between Two Endpoint Values In A Three-Dimensional Image Rendering Device," filed Dec. 20, 1991 and assigned to Apple Computer, Inc. Furthermore, it is to be understood that alternative rendering pipelines can be employed in conjunction with the teachings of the present invention.

Figure 6:
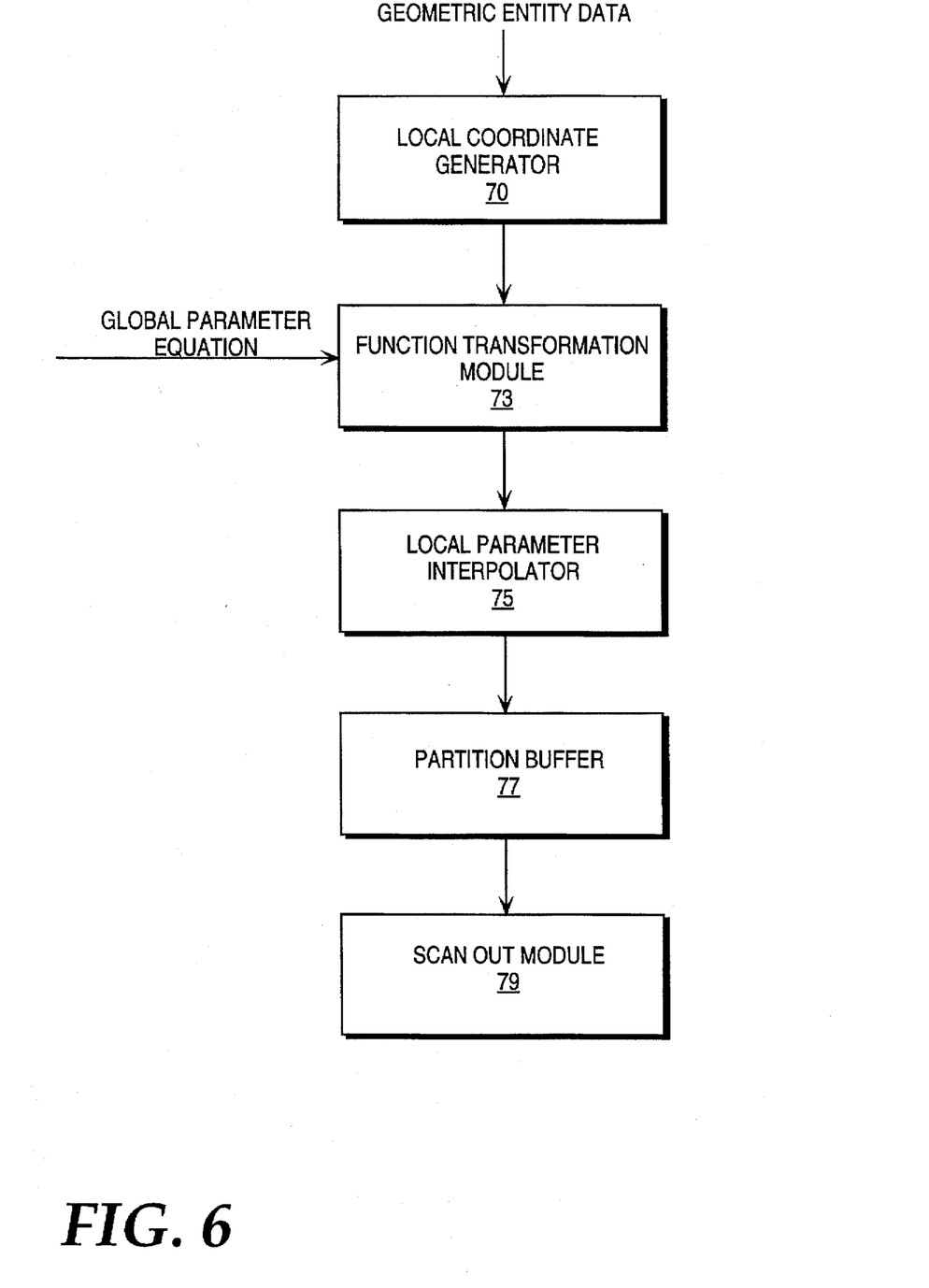
FIG. 6 illustrates one embodiment of the rendering pipeline of FIG. 4.

As shown in FIG. 6, the first module of rendering pipeline 65 is a local coordinate generator 70. This local coordinate generator (1) obtains the global boundary defining data (e.g., the vertex coordinates defined relative to the display device coordinate system) of the geometric entity that intersects a region that it renders, and (2) generates the local positional data (the x and y coordinates defined relative to the local coordinate system of the region that the pipeline renders) of the vertices of the geometric entity. For example, one embodiment of local coordinate generator 70 generates the local coordinates of the vertices of the geometric entity by using the following equations:

$x_{Left}$=global coordinate of the left edge of partition;

$x'$=local coordinates for the horizontal component=$x - x_{Left}$;

$y_{Top}$=global coordinate of the top edge of partition $y'$=local coordinates for the vertical component=$y - y_{Top}$.

From these local coordinates for the vertices of the geometric entities, the local coordinate generator also generates the remaining coordinates of the pixels in the rendered region that are covered by the geometric entity, by using one of the numerous prior art methods for deriving coordinates for the covered pixels of a partition from the vertex data (such as the direct evaluation of the line equations for the triangle edges for each scanline in the partition). Another example of general polygon scan-conversion methods that use vertex data to determine which pixels are covered by a geometric entity is "Computer Graphics, Principles and Practice, 2nd Edition," Foley, Van Dam, Feiner, and Hughes, Addison Wesley, pgs. 92–95.

Furthermore, as shown in FIG. 6, rendering pipeline 65 has a function transformation module 73 for calculating the parameter values for every pixel in the rendered region that are covered by the geometric entity. Numerous prior art parameter interpolation modules can be used as the function transformation module 73. In addition, another example of the local function transformation module 73 is disclosed in the U.S. patent application entitled "METHOD AND APPARATUS FOR DIRECTLY EVALUATING A PARAMETER INTERPOLATION FUNCTION USED IN RENDERING IMAGES IN A GRAPHICS SYSTEM THAT USES SCREEN PARTITIONING", Ser. No. 08/492,923 and assigned to Apple Computers, Inc.

The local parameter interpolator 75 then submits all of the generated pixel data (that the local coordinate interpolator and local parameter interpolator generated) to a buffer circuitry for storing.

This buffer circuitry may include a multi-layer buffer, a number of logic circuits, and a number of counters. The multi-layer buffer includes a pixel storage location for each pixel of the display device. Each pixel storage location can store pixel data for N geometric entities.

During each attempt to store a pixel data in a pixel storage location, the logic circuitry for the corresponding region detects whether this attempt has caused the pixel storage location to overflow or has effectively eliminated the overflow signal.

As further shown in FIG. 6, after the local parameter interpolator 75 directly calculates the parameter values for all of the pixels of the geometric entity that fall into the rendered region, partition buffer 77 is then used to collect the final values of the pixels for the partition being processed. Once all the objects in the partition have been processed, the contents of the partition buffer are transferred to the system frame buffer via scan out module 79. In other words, scan out module is used to transfer to the system frame buffer the contents of the partition buffer. It should be noted that for an alternative embodiment of rendering pipeline 65, the output of local parameter interpolator 75 is not supplied to partition buffer 77 but rather is supplied to a pixel buffer. The parameter values can then later be obtained from the pixel buffer in order to perform additional calculations with them.

Figure 7:
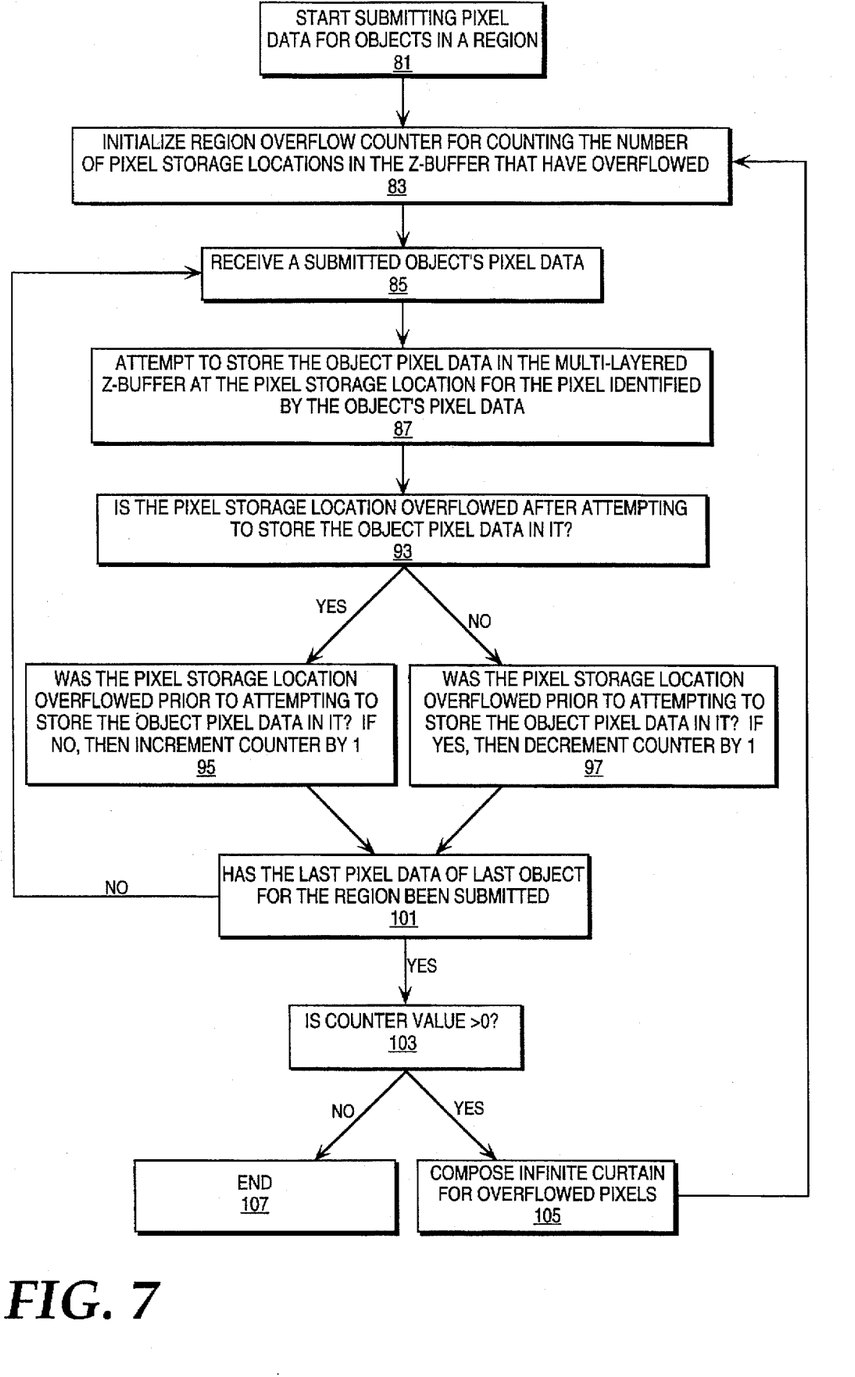
FIG. 7 illustrates a flowchart of the steps of the present invention.

FIG. 7 illustrates a flowchart of the method of the present invention. The method of dynamically detecting buffer overflows includes the step of initializing an overflow count value to a predetermined value 83. The method of the present invention also includes the step of receiving a submitted pixel data for a geometric entity to a multi-layer buffer 85. Attempting to store the geometric entity's pixel data in the buffer at a pixel storage location for the pixel, identified by the geometric entity's pixel data, is embodied in step 87.

If the pixel storage location was not overflowed prior to this attempt, but is overflowed after the attempt, then increment in the count value in a first direction by a predetermined unit 95. If the pixel storage location was overflowed prior to said attempt, but is not overflowed after the attempt, decrement the count value by a predetermined unit in a direction opposite to the first direction 97. Repeating blocks 85 through 97 until all geometric entities' pixel data in a region have been submitted for storing in the multi-layer buffer.

If the overflow count value differs from a predetermined value 103, which equals the initial value, then for each pixel storage location that is overflowed, composite the pixel data for the N geometric entity stored at the overflowed pixel storage location into a composite pixel data and storing said composite pixel as a replacement for said pixel data for said N geometric entity stored at the overflowed pixel storage location 105. Then, resubmitting all the geometric entities for storing in the multi-layer buffer and repeating blocks 83 through 105. The details of block 93 will be illustrated hereinafter with respect to FIG. 10.

Figure 8:
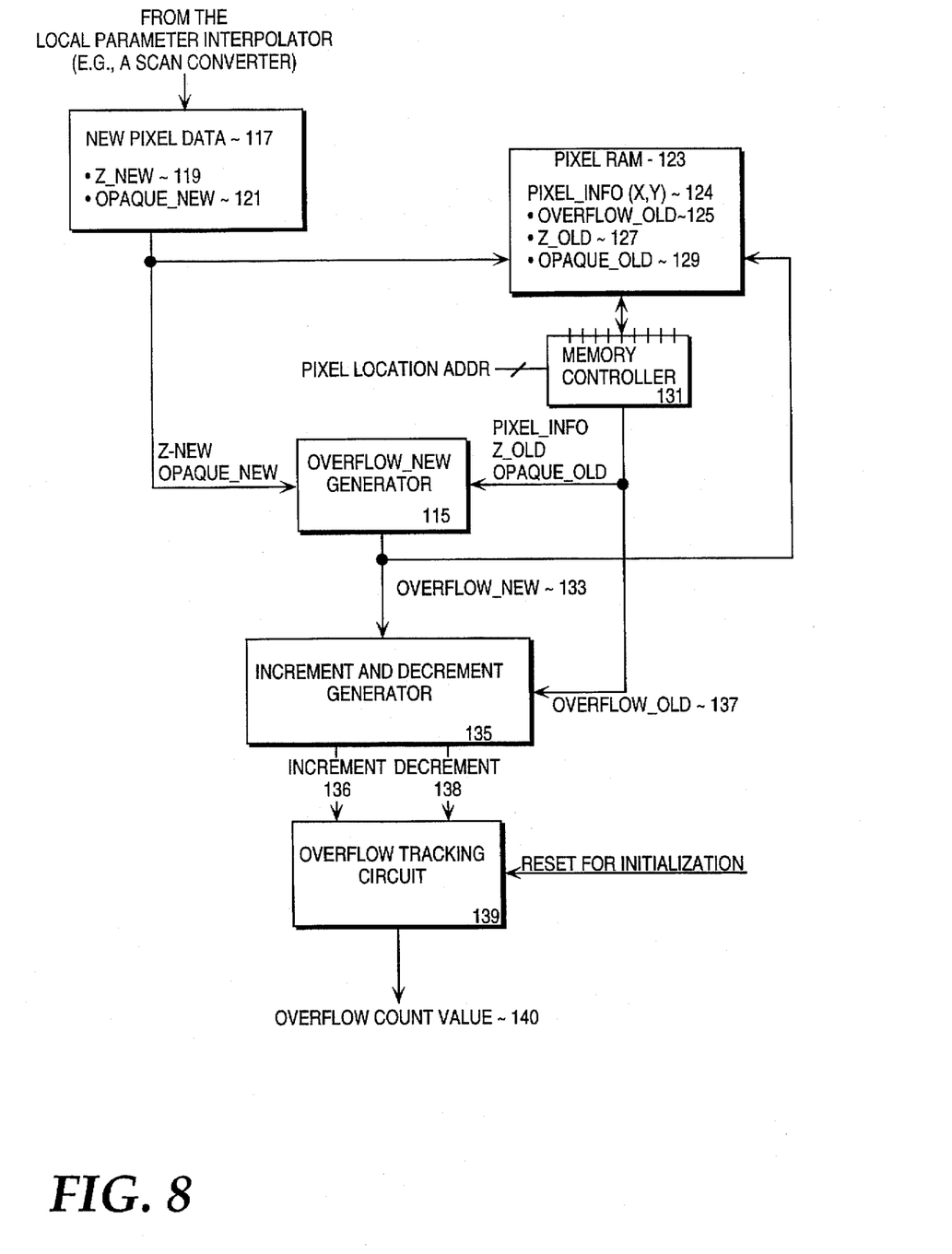
FIG. 8 illustrates the hardware components of the present invention.

FIG. 8 illustrates the circuitry components of the present invention. The present invention includes an Overflow_New Generator 115 for generating and providing an Overflow_New signal 133. The Overflow_New Generator 115 receives New Pixel Data 117 for a particular pixel storage location (e.g., representing a pixel) from the Local Parameter Interpolator 75 of FIG. 6 (e.g., a scan connecter for converting triangle information to pixel information) and Old Pixel Data in the form of Pixel_Info (x,y), where (x,y) defines a pixel on a display screen. Pixel_Info (x,y) is provided by pixel RAM 123 through Memory Controller 131. The New Pixel Data 117 includes Z_New 119, which stores the Z value of a New Pixel Data and also Opaque_New 121, which may be a flag that indicates whether or not this pixel data is opaque or transparent. Pixel_Info (x,y) 124 includes an Overflow_Old value 125, a Z_Old value 127 and an Opaque_Old flag 129 for a particular pixel at the location (x,y). The Overflow_New Generator 115 receives Pixel_Info (x,y) 124 from Pixel RAM 123 each time the pixel location address, which is provided by the Local Parameter Interpolator 75 of FIG. 6. The Memory Controller 131 selects which layer, if there is more than one layer. The critical signal that is provided Overflow_New Generator 115 from pixel RAM 123 is an Overflow_Old signal 137. This signal is also provided to a Increment and Decrement Generator 135. This Increment and Decrement Signal Generator 135 is also coupled to the Overflow_New Generator 115 and receives an Overflow_New signal 133 from the Overflow_New Generator 115.

The Increment and Decrement Generator 135 provides an Increment signal 136 and a Decrement signal 138 to an Overflow Tracking Circuit 139. The Overflow Tracking Circuit 139 maintains an overflow count value 140 (i.e., the number of overflows of a particular pixel or group of pixels). An overflow count value 140 may be maintained for one pixel or a plurality of pixels (e.g., a region on a screen of a display device). The Increment and Decrement Signal Generator 135 and the Overflow Tracking Circuit 139 will be described in greater detail hereinafter with respect to FIG. 9. How an Overflow_New signal 133 is generated by the Overflow New Generator 115 will be described with respect to FIG. 10 hereinafter.

Figure 9:
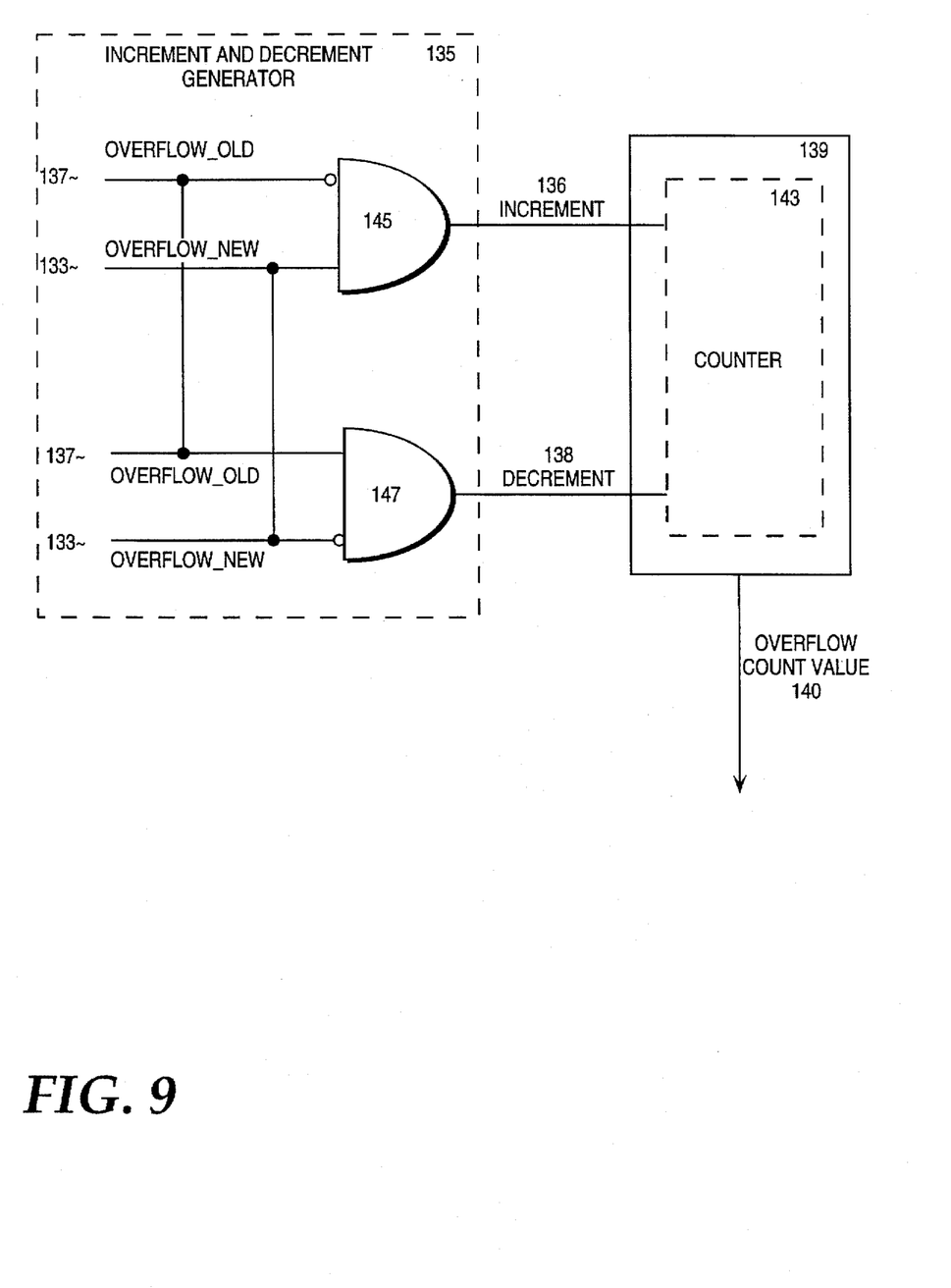
FIG. 9 illustrates in further detail the Overflow_New generator and the Increment and Decrement generator.

FIG. 9 illustrates the Increment and Decrement Signal Generator 135. This Increment and Decrement Generator 135, in one embodiment, includes a first AND gate 145 and a second AND gate 147. The first AND gate 145 is provided the Overflow_New Signal 133 and an inverted Overflow_Old signal 137 and provides the Increment signal 136 to the Overflow Tracking Circuitry 139. Similarly, the second AND gate 147 is provided an inverted Overflow_New signal 133 and the Overflow_Old signal 137 and provides the Decrement signal 138 to the Overflow Tracking Circuit 139.

The Overflow Tracking Circuitry 139 may be implemented as a counter 143 that receives the Increment signal 136 and the Decrement signal 138. Upon receiving an Increment signal 136, the counter 143 increments the current value of the counter; similarly, when the counter 143 receives a Decrement signal 138, the counter 143 decreases the current count value. These counters are well known in the art.

An overflow count value 140 is stored for each partition, so that at the end of the compositing phase, the present invention provides a number of overflows per partition. An Overflow_Old value is stored for each pixel storage location.

Figure 10:
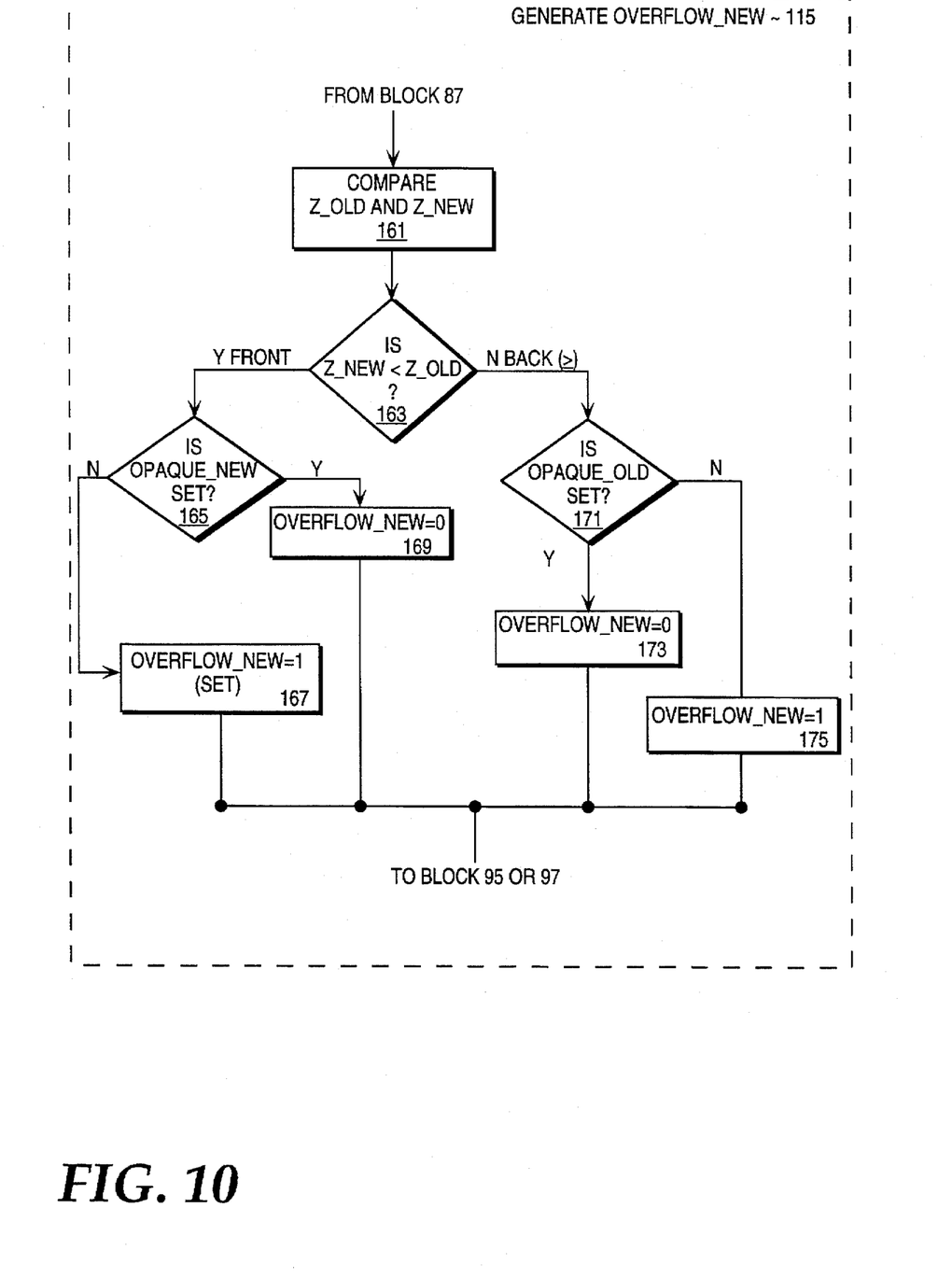
FIG. 10 illustrates in greater detail how the present invention determines the Overflow_New value.

FIG. 10 illustrates the specific steps that are carried out by the Overflow_New Generator 115. First, the Overflow_New generator 115 compares Z_Old 127 and Z_New 119 (step 161). Next, a determination is made whether Z_New is less than Z_Old (decision block 163). If this conditional is true, (i.e., the new pixel data is in front of the old pixel data) then a second determination is made of whether the new pixel data is opaque (i.e., is Opaque_New 121 set?) (decision block 165). If the new pixel is opaque, then the Overflow_New Generator 115 de-asserts the Overflow_New 133 Signal (block 167). If the new pixel is not opaque, then the Overflow_New Generator 115 asserts the Overflow_New signal (block 165).

If Z_New 119 is equal to or greater than Z_Old 127 (i.e., the old data pixel is in front of the new pixel) then a determination is made on whether the old pixel is opaque (decision block 171). If the old pixel is opaque (i.e., if Opaque_Old 129 is set), then the Overflow_New 133 generator 115 de-asserts Overflow_New 133 signal (block 173). However, if the old pixel is not opaque (i.e., Opaque_Old 129 is not set), Overflow_New Generator 115 sets the Overflow_New 133 signal (block 175).

The above-described steps are accurate for the first pass (i.e., when there is no infinite curtain layer). When an infinite curtain layer is present, the new Z value must be greater than the infinite curtain Z value. If not, the new pixel data is automatically discarded.

Figure 11:
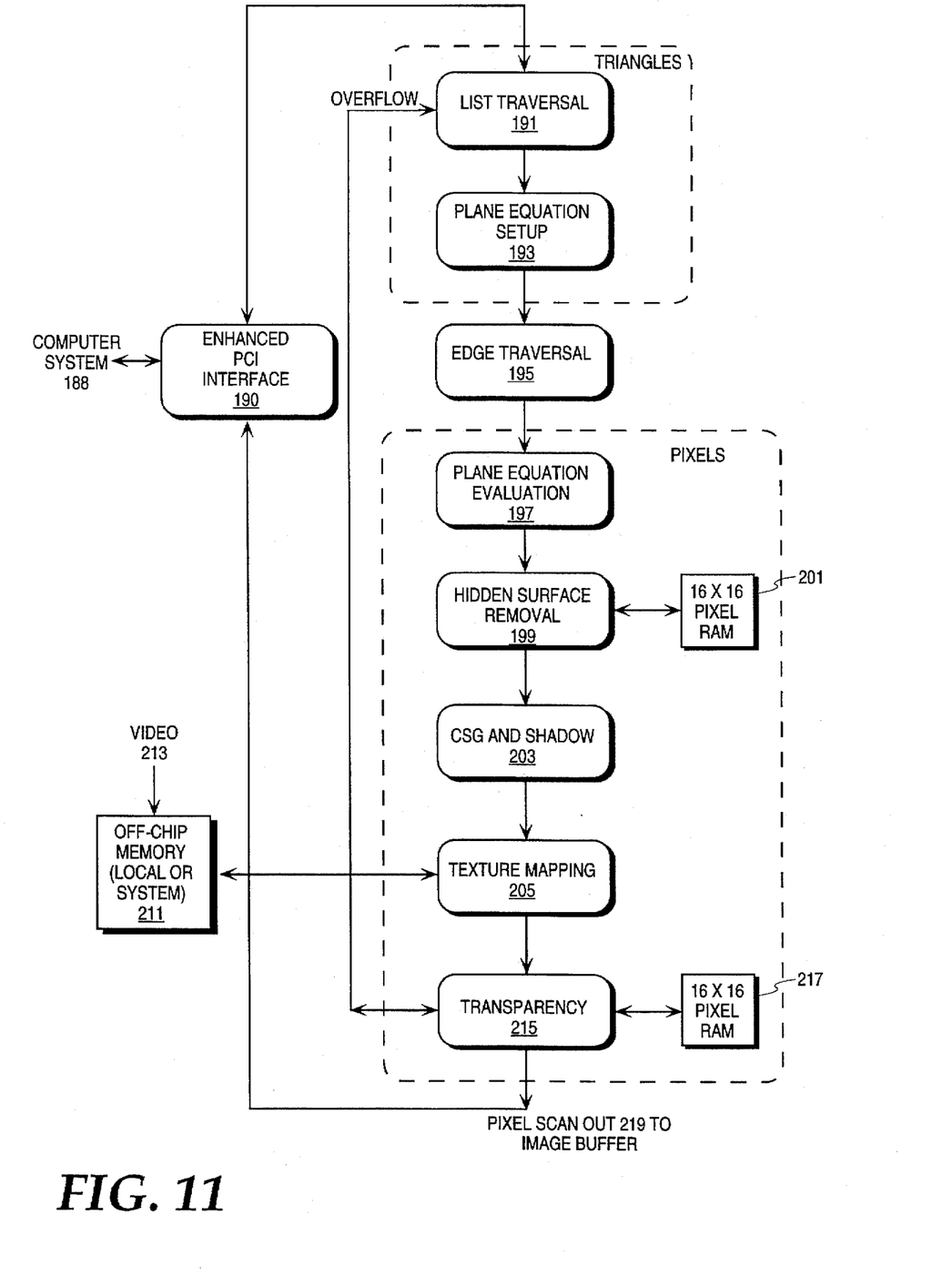
FIG. 11 illustrates an exemplary system in which the present in invention may be implemented.

FIG. 11 illustrates the exemplary computer system in which the present invention may be implemented. The computer system 188 is coupled to an enhanced PCI interface 190. The enhanced PCI Interface 190 is coupled to circuitry for implementing List Traversal 191, circuitry for Plane Equation Set-up 193, and circuitry for implementing equations for Edge Traversal 195.

The Edge Traversal Circuitry 195 is further coupled to circuitry for implementing Plain Equation Evaluation 197 that is in turn coupled to circuitry for implementing Hidden Surface Removal algorithms 199. The Hidden Removal Circuitry 199 is further coupled to a memory, which may be implemented by a 16×16 pixel RAM 210. The Hidden Surface Removal Circuitry 199 is further coupled to circuitry for implementing CSG and Shadow techniques 203, that is in turn coupled to circuitry for Texture Mapping 205. The Texture Mapping circuitry 205 is further coupled to an off-chip memory 211 that receives video input 213. The Texture Mapping circuitry 205 is further coupled to circuitry for processing transparency 215, which is coupled to a memory (which may implemented with a 16×16 pixel RAM 217). The Transparency circuitry 215 also produces a pixel scan out 219 to image buffer 219 through the enhanced PCI interface 190. The Transparency circuitry 215 also produces an overflow signal which is provided to the circuitry for traversal 191.

The present invention may be implemented in the Transparency circuitry 215 in order to provide an overflow signal to the List Transversal circuitry 191.

It is very efficient to evaluate the buffer overflow using a counter because only one pixel can overflow during a clock cycle. If multiple pixels could overflow a more conventional logical "or" tree would be used to evaluate the buffer overflow. The inputs to the tree are an overflow signal (overflow-old) for each pixel in the buffer, essentially a one bit counter per pixel.

In addition to determining when an overflow has occurred for any pixel in the buffer, it can be useful to determine which specific pixel or pixels caused the overflow. Often the pixels which overflow are concentrated in a specific region of the buffer, so it is possible to only resubmit objects in that region of the buffer instead of all of the objects in the buffer.

In FIG. 5 the buffer is divided into 4 equal regions as shown. Just as there is an overflow counter for the buffer, there is also an overflow counter for each of the 4 regions. A region can vary in size from a few pixels to nearly the entire buffer, and the regions do not have to be uniform in size or dimension. As in the case of the buffer overflow counter, the region overflow counter must match the resolution of the buffer.

One of ordinary skill in the art would recognize that the above-described invention may be embodied in other specific forms without departing from the spirit or the essential characteristics of the disclosure. Thus, while certain exemplary embodiments have been described and shown in the accompanying drawings, the invention is not to be limited by the foregoing illustrative details but rather is to be defined by the appended claims.

What is claimed is:

1. For a computer graphics system having a display device and a multi-layer buffer, said display device having at least one region, said region having a plurality of pixels for displaying geometric entities, said buffer having a pixel data storage location for each pixel of said region, each pixel data storage location for storing more than one geometric entity's pixel data for its pixel, a method of dynamically detecting buffer overflows, said method comprising the steps of:

(a) initializing an overflow count value to a predetermined value, said overflow count value indicating number of overflowed pixel storage locations;

(b) submitting pixel data for a geometric entity to said multi-layer buffer;

(c) attempting to store said geometric entity's pixel data in said buffer at a pixel storage location for the pixel identified by said geometric entity's pixel data;

(d) if said pixel storage location was not overflowed prior to said attempt but is overflowed after said attempt, incrementing in a first direction said count value by a predetermined unit;

(e) if said pixel storage location was overflowed prior to said attempt but is not overflowed after said attempt, decrementing in a second direction opposite said first direction said count value by said predetermined unit;

(f) repeating steps (b) through (e) until all geometric entities' pixel data in said region have been submitted for storing in said multi-layer buffer.

2. The method of claim 1 further comprising the steps of:

if said overflow count value differs from said predetermined value, (g) for each pixel storage location that is overflowed, compositing the pixel data for the N geometric entities stored at the overflowed pixel storage location into a composite pixel data and storing said composite pixel data as a replacement for said pixel data for said N geometric entities stored at the overflowed pixel storage location (h) resubmitting all said geometric entities for storing in said multi-layer buffer and repeating steps (a) through (f).

3. The method as set forth in claim 1 further comprising the steps of:

a) generating an increment signal based upon the first and second overflow signals; and b) generating a decrement signal based upon the first and second overflow signals.

4. The method as set forth in claim 3 wherein the step of generating the decrement signal further includes the steps of
   a) inverting the second overflow signal; and
   b) performing a logical AND operation on the first overflow signal and the inverted second overflow signal;
wherein the step of generating the increment signal further includes the steps of
   a) inverting the first overflow signal; and
   b) performing a logical AND operation on the inverted first overflow signal and the second overflow signal.

5. The method as set forth in claim 3 further comprising the steps of maintaining an overflow count in response to the increment and decrement signals.

6. For a computer graphics system having a display device and a multi-layer buffer, said display device having a first region, said first region having a plurality of sub regions, said first region having a plurality of pixels for displaying geometric entities, said buffer having a pixel data storage location for each pixel of said first region, each pixel data storage location for storing more than one geometric entity's pixel data for its pixel, a method of dynamically detecting buffer overflows, said method comprising the steps of:
   (a) initializing a first region overflow count value and a plurality of sub region count values to a predetermined value, wherein said first region overflow count value indicates number of overflowed pixel storage locations for all pixels of said first region, and each of said sub region count value indicates number of overflowed pixel storage locations for all of its pixels
   (b) submitting pixel data for a geometric entity to said multi-layer buffer;
   (c) attempting to store said geometric entity's pixel data in said buffer at a pixel storage location for the pixel identified by said geometric entity's pixel data;
   (d) if said pixel storage location was not overflowed prior to said attempt but is overflowed after said attempt, incrementing by one (i) said first region count value, and (ii) the sub region count value for the sub region in which said identified pixel is in;
   (e) if said pixel storage location was overflowed prior to said attempt but is not overflowed after said attempt, decrementing by one (i) said first region count value, and (ii) the sub region count value for the sub region in which said identified pixel is in;
   (f) repeating steps (b) through (e) until all geometric entities' pixel data have been submitted for storing in said buffer.

7. The method of claim 6 further comprising the steps of:
   (g) if said first region overflow count value is greater than zero, identifying the sub region overflow count values that are greater than zero;
   for each sub region whose corresponding local overflow count value is greater than zero:
   (h) for each pixel storage location that is overflowed, compositing the pixel data for the N geometric entities stored at the overflowed pixel storage location into a composite pixel data and storing said composite pixel data as a replacement for said pixel data for said N geometric entities stored at the overflowed pixel storage location
   (i) resubmitting all said geometric entities for storing in said multi-layer buffer and repeating steps (a) through (f).

8. A method for dynamically removing an overflow for a pixel storage location, said pixel storage location including a predetermined number of pixel data, said method comprising the steps of:
   a) receiving a first Z value and a first opaque signal, said first Z value and said first signal associated with a first pixel data, said first opaque signal indicating whether the first pixel data is opaque or transparent;
   b) receiving a second Z value and a second opaque signal, said second Z value and second opaque signal being associated with a second pixel data, said second opaque signal indicating whether the second pixel data is opaque or transparent;
   c) further receiving a second overflow signal associated with the second pixel data;
   d) dynamically clearing the second overflow signal based upon the first Z value, the first opaque signal, the second Z value and the second opaque signal; and
   e) assigning the first Z value and the first opaque signal with the second Z value and the second opaque signal, respectively, and assigning a first overflow signal with the second overflow signal.

9. The method as set forth in claim 8 wherein the step of dynamically clearing the second overflow signal further comprises the steps of:
   a) comparing the first Z value with the second Z value;
   b) if the first Z value is greater than or equal to the second Z value then determining if the first opaque signal is asserted,
      i) if the first opaque signal is asserted, then asserting the second overflow signal,
      ii) else asserting the second overflow signal;
   c) if the first Z value is less than the second Z value, then determining if the second opaque signal is asserted;
      i) if the second opaque signal is asserted, then asserting the second overflow signal,
      ii) else asserting the second overflow signal.

10. The method as set forth in claim 8 further comprising the steps of:
   a) incrementing an overflow count upon a first predetermined condition; and
   b) decrementing the overflow count upon a second predetermined condition.

11. The method as set forth in claim 10 wherein the first predetermined condition is when the first overflow signal is de-asserted and the second overflow signal is asserted; and wherein the second predetermined condition is when the first overflow signal is asserted and the second overflow signal is de-asserted.

12. The method as set forth in claim 8 further comprising the steps of:
   a) asserting the second overflow signal upon a first predetermined condition, and
   b) clearing the second overflow signal upon a second predetermined condition.

13. The method as set forth in claim 12 wherein the first predetermined condition is at least one of the following:
   when the first Z value is greater than the second Z value, and the second opaque signal is de-asserted; and
   when the first Z value is greater that or equal to the second Z value, and the first opaque signal is de-asserted.

14. The method as set forth in claim 12 wherein the second predetermined condition is at least one of the following:

when the first Z value is greater than the second Z value, and the second opaque signal is asserted; and when the first Z value is less than or equal to the second Z value, and the first opaque signal is asserted.

15. A computer graphics system having a pixel storage location, said pixel storage location including a pixel data, said computer graphics system comprising:

a) means for providing a first Z value and a first opaque signal, said first Z value and said first signal associated with a first pixel data, said first opaque signal indicating whether the first pixel data is opaque or transparent;

b) means for providing a second Z value and a second opaque signal, and a second overflow signal, said second Z value and, second opaque signal, and second overflow signal being associated with a second pixel data, said second opaque signal indicating whether the second pixel data is opaque or transparent; and c) means coupled to the first and second providing means for dynamically maintaining the second overflow signal.

16. The computer graphics system as set forth in claim 15 wherein the means for dynamically maintaining the second overflow signal includes a) a first comparator for comparing the first Z value with the second Z value;

b) first means coupled to the first comparator for determining whether the second opaque signal is asserted;

c) second means, coupled to first comparator for determining; whether the first opaque signal is asserted; and d) means coupled to the first determining means for dynamically asserting the second overflow signal based upon the first Z value, the first opaque signal, the second Z value, and the second opaque signal.

17. The computer graphics system as set forth in claim 16 further comprising:

a) means coupled to the first determining means for dynamically asserting the second overflow signal based upon the first Z value, the first opaque signal, the second Z value, and the second opaque signal.

18. The computer graphics system as set forth in claim 15 further comprising an overflow tracking circuitry coupled to the means for dynamically maintaining the second overflow signal, said overflow tracking circuitry maintaining a count of the number of overflows for the pixel storage location.

19. The computer graphics system as set forth in claim 18 further comprising means for generating at least one of an increment signal and a decrement signal to the overflow tracking circuitry, wherein the increment and decrement signals are generated in response to the first overflow signal and the second overflow signal.

20. The computer graphics system as set forth in claim 19 wherein the means for generating an increment and decrement signal includes a) a first AND gate for receiving an inverted first overflow signal and a second overflow signal and providing the increment signal, and b) a second AND gate receiving a first overflow signal and an inverted second overflow signal and providing the decrement signal;

wherein the increment and decrement generator means is coupled to the overflow tracking circuitry.

21. The computer graphics system as set forth in claim 18 wherein the overflow tracking circuitry is an up-down counter.

* * * * *